R. HUFF.
HYDROCARBON MOTOR.
APPLICATION FILED FEB. 21, 1912.

1,122,121.

Patented Dec. 22, 1914.

Witnesses

Inventor
Russell Huff
by
Attorney

UNITED STATES PATENT OFFICE.

RUSSELL HUFF, OF DETROIT, MICHIGAN, ASSIGNOR TO PACKARD MOTOR CAR COMPANY, OF DETROIT, MICHIGAN, A CORPORATION OF MICHIGAN.

HYDROCARBON-MOTOR.

1,122,121.    Specification of Letters Patent.    Patented Dec. 22, 1914.

Application filed February 21, 1912. Serial No. 679,170.

*To all whom it may concern:*

Be it known that I, RUSSELL HUFF, a citizen of the United States, and resident of Detroit, Wayne county, State of Michigan, have invented certain new and useful Improvements in Hydrocarbon-Motors, of which the following is a specification.

This invention relates to hydrocarbon motors and particularly to the construction of the intake manifold or header therefor.

In a hydrocarbon motor such as is employed for motor vehicles, which comprises six or more cylinders with the cylinders cast either singly or in pairs, one of the most difficult problems confronting the designer is to produce an intake manifold or header that will correctly distribute the gases to the various cylinders, have a neat and compact appearance, and be a practical manufacturing proposition. It has been found that too long a manifold or a manifold with too many branches, may give a good distribution of gases at certain speeds, but with so much surface exposed to the atmosphere, condensation of the hydrocarbon in the manifold takes place to an alarming extent, which causes the motor to choke when suddenly throttled. A short manifold, therefore, has advantages over a long manifold, but in an ordinary straight manifold the intake opening would necessarily be closer to some of the outlets than to others so that one cylinder or one pair of cylinders might rob an adjacent cylinder or pair of cylinders and a bad distribution of gases result.

It is the object of the present invention to produce an approximately straight manifold, which may be set close to the cylinders so that the outlet branches from the main tube may be as short as possible, and which is provided with a deflector block between the inlet opening of the manifold and the adjacent outlet opening so that the inrushing gases will be directed toward the more remote outlet openings, thus giving the desired correct distribution of gases. At the same time this deflector block is utilized to strengthen the manifold at its weakest point and to provide means for attaching the manifold to the adjacent motor cylinder.

Figure 1:
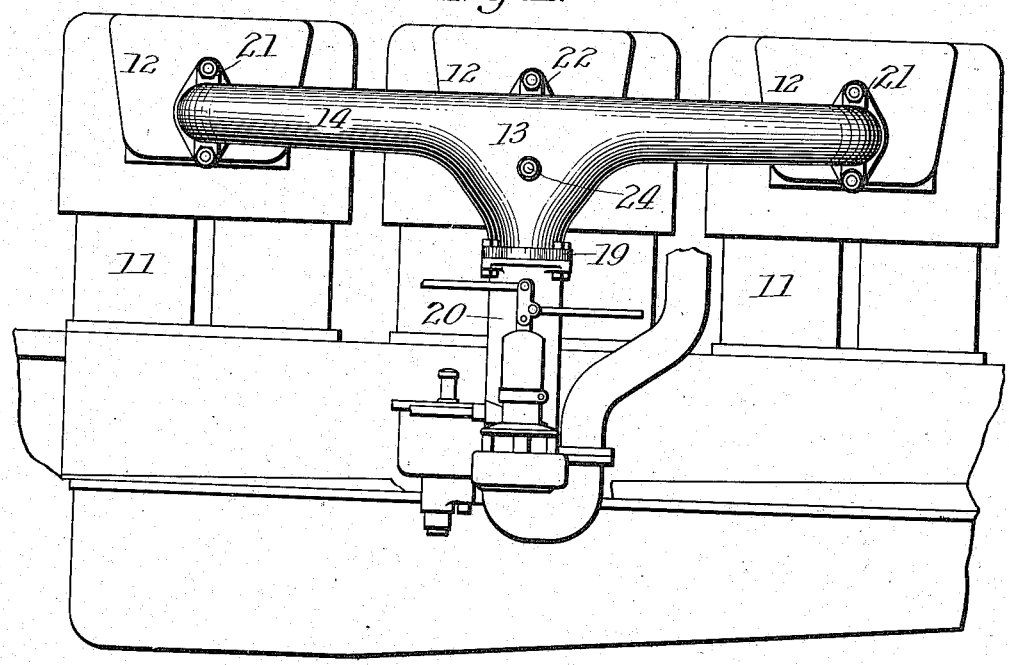
Figure 2:
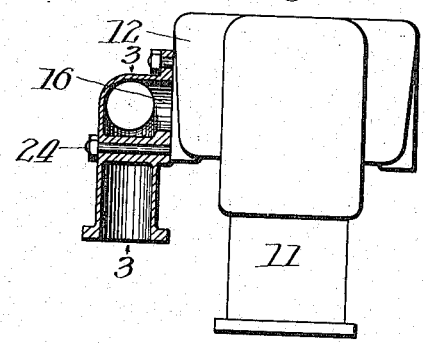
Figure 3:
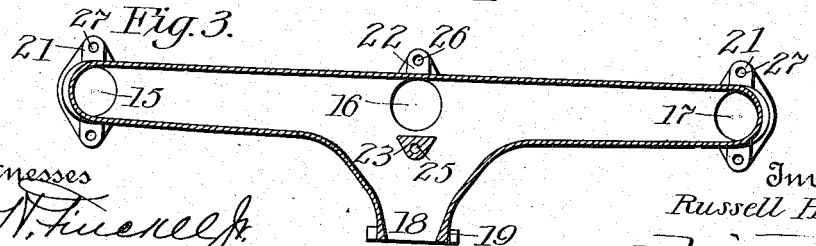

With the above and other objects in view, the invention may be described in connection with the accompanying drawings as follows:

Figure 1 is a side elevation of a six-cylinder motor with an intake manifold constructed according to this invention; Fig. 2 is an end view of the motor with the manifold in vertical section; and Fig. 3 is a longitudinal vertical section of the manifold taken on the line 3—3 of Fig. 2.

The motor crank case or base is indicated at 10 upon which the cylinders 11 are supported, there being in the present instance six cylinders cast in pairs. Each of the cylinder castings has an intake valve chamber 12 through which the explosive mixture passes to the explosion space.

The intake manifold or header is indicated at 13, comprising a tubular body part 14 extending horizontally alongside the cylinders with three horizontal openings 15, 16 and 17, which are adapted to comunicate with the three valve chambers 12 of the cylinders. The opening 16 is arranged centrally of the manifold in a plane with and adjacent the vertical opening 18, forming the intake opening of the manifold. A flange 19 is provided for securing the carbureter 20 to the manifold as shown particularly in Fig. 1. Flanges 21 are also provided at the extreme ends of the manifold for securing the manifold to the cylinders. A flange 22 is also provided adjacent the opening 16 for securing the central part of the manifold to the middle cylinder casting.

To obviate sharp corners the manifold is somewhat enlarged near its middle portion so that an easy curve is formed from the opening 18 into the body of the manifold toward either end. Such construction would tend to give the gases easier access to the middle cylinders of the motor than to the forward and rear cylinders, and partly for this reason a filler or deflector block 23 is formed in the manifold directly above the opening 18 and between it and the opening 16. This deflector is of somewhat triangular shape in cross section as shown in Fig. 3, and tends to separate the stream of gases entering at the opening 18 and direct it toward the ends of the manifold, thus to some extent deflecting the gases from the opening 16. This causes an approximately even distribution of the gases to the three cylinder castings without making the intake header any longer than is absolutely necessary to reach from the carbureter to all of the cylinders.

The filler block 23 also tends to strengthen the manifold at its weakest point, which is of some importance because of the fact that in motors of this type for motor vehicles it is the custom to make these manifolds of cast aluminum, and it is desirable to have the castings as thin as possible. By thus having the manifold strengthened at this point it may be secured to the middle cylinder casting by a bolt 24 passing from the face of the manifold directly through a hole 25 in the filler block and into the cylinder casting. Were it not for the filler block at this point it would be impracticable to use a through bolt because of the possibility of leakage in the manifold, and the manifold is set so close to the cylinder castings as shown particularly in Fig. 2, that it is impossible to flange the manifold at that point and insert a bolt from the inner side. By the present construction the bolt hole 25 and the bolt hole 26 in the flange 22 bear the same relation to the middle cylinder casting 12 as do the holes 27 in the flanges 21 to the forward and rear cylinder castings. In manufacturing this means that a single pattern will do for all three cylinder castings, which is of considerable advantage.

Having thus described the invention, what is claimed is:

In a hydrocarbon motor, the combination with the cylinders, of a manifold comprising a substantially straight tube having outlet openings at its ends and adjacent inlet and outlet openings at its middle, said tube being enlarged at its middle and tapering from its body to said inlet opening, a deflector block of triangular cross section in the manifold at said enlargement and arranged between said adjacent inlet and outlet openings with its apex toward the inlet opening, whereby the incoming gases are deflected away from the middle outlet opening and toward the openings at the ends of the tube.

In testimony whereof I affix my signature in the presence of two witnesses.

RUSSELL HUFF.

Witnesses:
W. H. FINCKEL, Jr.,
E. A. KIELME.